United States Patent
Ishihara

(10) Patent No.: US 9,041,940 B2
(45) Date of Patent: May 26, 2015

(54) THREE-DIMENSIONAL SHAPE MEASURING APPARATUS

(75) Inventor: Mitsuhiro Ishihara, Hamamatsu (JP)

(73) Assignee: TAKAOKA TOKO CO., LTD., Tokyo (JP)

( * ) Notice: Subject to any disclaimer, the term of this patent is extended or adjusted under 35 U.S.C. 154(b) by 297 days.

(21) Appl. No.: 13/610,052

(22) Filed: Sep. 11, 2012

(65) Prior Publication Data

US 2013/0201488 A1    Aug. 8, 2013

(30) Foreign Application Priority Data

Feb. 3, 2012    (JP) .................................. 2012-022189

(51) Int. Cl.
  *G01B 11/30*    (2006.01)
  *G01B 11/24*    (2006.01)
  *G02B 21/00*    (2006.01)

(52) U.S. Cl.
  CPC .............. *G01B 11/24* (2013.01); *G02B 21/008* (2013.01)

(58) Field of Classification Search
  CPC .............. G01B 21/0044; G01B 11/30–11/306; G01B 11/24–11/255; G02B 21/0036–21/0048
  USPC ........................................................ 356/609
  See application file for complete search history.

(56) References Cited

U.S. PATENT DOCUMENTS

| | | | | |
|---|---|---|---|---|
| 4,748,335 | A * | 5/1988 | Lindow et al. | ........... 250/559.22 |
| 5,959,427 | A * | 9/1999 | Watson | ......................... 318/687 |
| 6,496,273 | B1 * | 12/2002 | Stimpson et al. | ............ 356/614 |
| 2005/0128896 | A1 | 6/2005 | Katayama | |

FOREIGN PATENT DOCUMENTS

| | | | |
|---|---|---|---|
| EP | 1 482273 A1 | 12/2004 | |
| JP | 9-126739 | 5/1997 | |
| JP | 10239036 A * | 9/1998 | ............. G01B 11/24 |
| JP | 2001-83426 | 3/2001 | |
| JP | 2003247817 A * | 9/2003 | ............. G01B 11/24 |
| JP | 2006-235250 | 9/2006 | |
| TW | 200724969 | 7/2007 | |
| TW | 200837385 | 9/2008 | |
| TW | 200933123 | 8/2009 | |
| TW | 201200901 A1 | 1/2012 | |

OTHER PUBLICATIONS

U.S. Appl. No. 13/610,112, filed Sep. 11, 2012, Ishihara.
U.S. Appl. No. 13/610,052, filed Sep. 11, 2012, Ishihara.
Taiwanese Office Action issued Jul. 24, 2014, in Taiwan Patent Application 101136679 (with English translation).
Office Action issued Feb. 28, 2015, in Japanese Patent Application No. 201210487146.4 (with English-language translation).

* cited by examiner

*Primary Examiner* — Michael A Lyons
*Assistant Examiner* — Shawn Decenzo
(74) *Attorney, Agent, or Firm* — Oblon, McClelland, Maier & Neustadt, L.L.P.

(57) ABSTRACT

According to one embodiment, a three-dimensional shape measuring apparatus includes at least an aperture plate that is provided with a plurality of confocal apertures which are two-dimensionally arranged to have a predetermined arrangement period, and an aperture plate displacement portion that displaces the aperture plate at a constant speed in a predetermined direction perpendicular to the optical axis direction. Further, the aperture plate is provided with a cover member which is moved integrally with the aperture plate and which includes a transparent body allowing the light beams from the light source to pass therethrough and to be irradiated to the plurality of confocal apertures, and protects the plurality of confocal apertures from dust. Further, an imaging optical system, by which each of reflected light beams is guided to a photo-detector, is designed in consideration of optical properties of the whole optical system including the transparent body of the cover member.

8 Claims, 10 Drawing Sheets

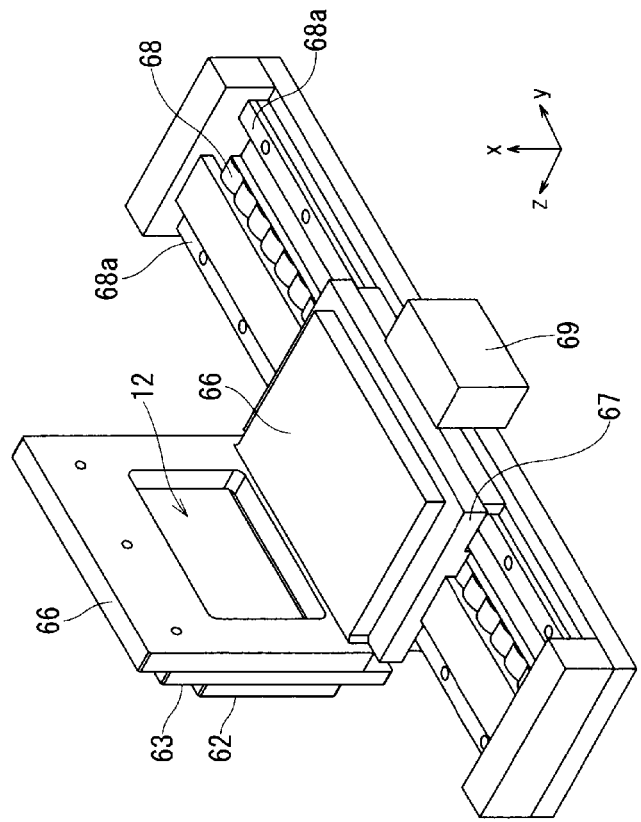
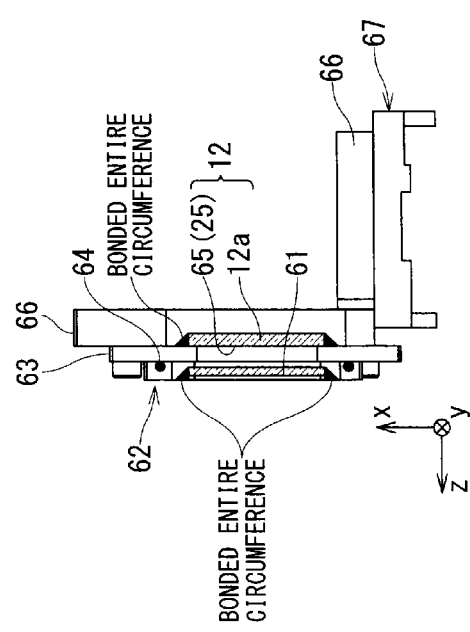
FIG. 6B
FIG. 6A

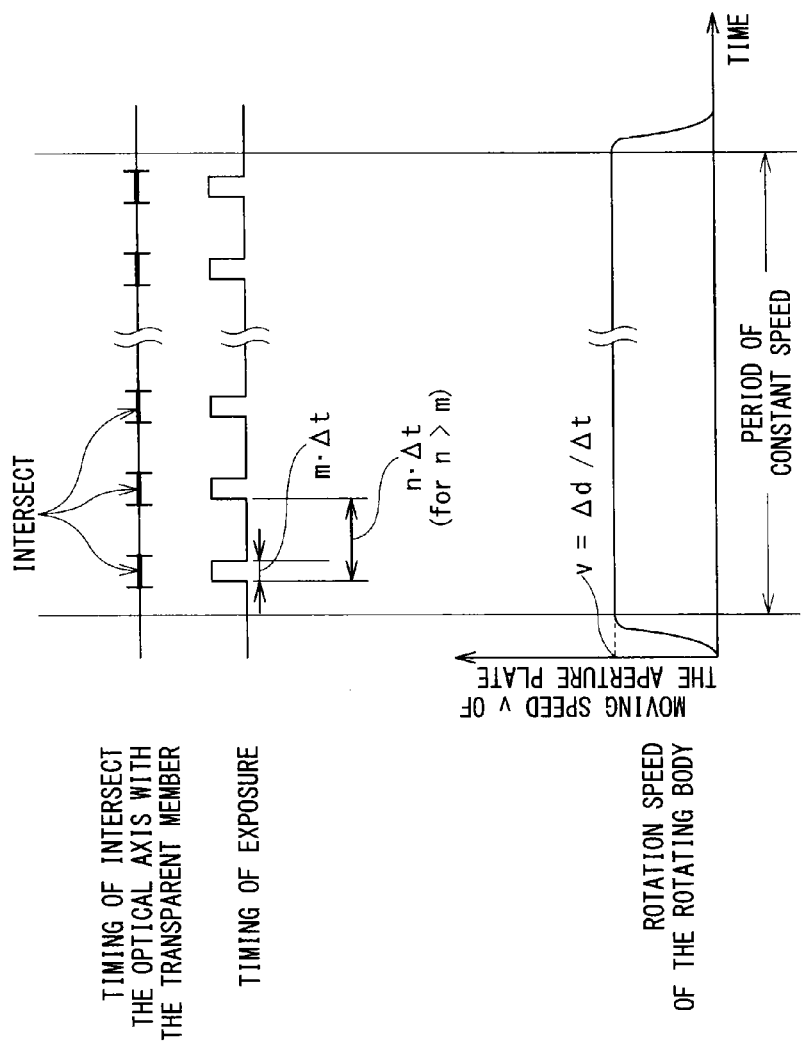

THREE-DIMENSIONAL SHAPE MEASURING APPARATUS

CROSS-REFERENCE TO RELATED APPLICATIONS

This application claims the benefit of priority of Japanese Patent Application No. 2012-022189, filed Feb. 3, 2012, the entire contents of which are incorporated herein by reference.

FIELD

Embodiments described herein relate generally to a three-dimensional shape measuring apparatus which measures a three-dimensional shape of an object by using a confocal optical system.

BACKGROUND

As one of the methods for measuring a three-dimensional shape, such as an the surface shape of an object, there is a method in which the surface shape of an object is measured by acquiring information on the height of each point on the surface of the object by using a confocal optical system. In the measurement using a confocal optical system, the measurement is performed, in principle, for each point, and hence a special contrivance is necessary to measure a surface area.

As this type of technique for measuring a surface area, such as the surface of an object, by using a confocal optical system, a technique is disclosed in JP-A 9-329748.

JP-A 9-329748 discloses a confocal microscope provided with a light source and a Nipkow disk in which a plurality of apertures are formed. Each of the apertures functions as a point light source and a detector. A plurality of light beams respectively having passed through the plurality of apertures are converged by an objective lens to respectively corresponding converging positions on the side of a measurement object. Therefore, when the Nipkow disk is rotated, each of the light beams (hereinafter referred to as spots) having passed through the plurality of apertures and converged at the plurality of converging positions on the side of the measurement object can be easily scanned at high speed on the surface of the measurement object.

However, it is difficult to prevent adverse effects resulting from the rotation of the Nipkow disk in the method in which the spots are scanned on the surface of the measurement object by using the Nipkow disk. Examples of the adverse effects resulting from the rotation of the Nipkow disk include the fact that the curvature of the curve of the trajectory drawn by the aperture according to the rotation of the Nipkow disk is different according to the distance from the center of the disk. The curvature of the trajectory is different for each of the apertures, and thereby a variation occurs such that the scanning speed is different for each of the apertures. Further, it is not possible to avoid rotational deflection due to the eccentricity of the disk, and to avoid vibration generated by the continuous rotation of the disk.

SUMMARY

The present invention has been made in light of the above situation, and accordingly it is an object of the present invention to provide a three-dimensional shape measuring apparatus capable of linearly scanning a plurality of spots on the surface of a measurement object.

To solve the above-described issues, a three-dimensional shape measuring apparatus according to an aspect of the present invention uses a confocal optical system, and includes an aperture plate, an objective lens, a focus position changing unit, a photo-detector group, an aperture plate displacement unit, an imaging control unit, a height determination unit, a cover member, and an imaging optical system. The aperture plate is provided with a plurality of confocal apertures which respectively allow light beams from a light source to pass therethrough and which are two-dimensionally arranged to have a predetermined arrangement period. The objective lens converge each of the light beams having passed through the plurality of confocal apertures, at an object side focused point, and again converge each of reflected light beams formed by reflection of converged light beams at a measurement object, at respectively corresponding confocal apertures. The focus position changing unit includes a rotating body provided thereon with a plurality of parallel plate type members different from each other at least in one of refractive index and thickness and arranged along a rotation direction so as to cross an optical axis of the objective lens, and a driving portion configured to continuously rotate the rotating body at a predetermined speed. And the focus position changing unit discretely changes a position of the object side focused point in an optical axis direction each time the parallel plate type member crossing the optical axis is changed by rotation of the rotating body. The photo-detector group includes a plurality of photo-detectors each of which outputs a signal corresponding to an intensity of a reflected light beam having again passed through the confocal aperture. The aperture plate displacement unit displaces the aperture plate at a constant speed in a predetermined direction perpendicular to the optical axis direction so as to change a relative positional relationship between the position of the object side focused point and a position of the measurement object in the direction perpendicular to the optical axis direction. The imaging control unit makes the photo-detector group perform exposure a plurality of times in a period of constant speed movement of the aperture plate in the predetermined direction perpendicular to the optical axis direction, and makes the photo-detector group perform each of the exposures each time an imaging target region is included in the parallel plate type member. Further, the imaging control unit controls a moving speed of the aperture plate, a rotation speed of the rotating body, and an exposure time and exposure timing of the photo-detector group so that the exposure time of the photo-detector group coincides with a time during which the aperture plate is moved by a distance obtained by multiplying the predetermined arrangement period by a first positive integer. The height determination unit estimates, based on the signal of the photo-detector for each of the positions of the object side focused points discretely changed in the optical axis direction by the focus position changing unit, the position of the measurement object at which the intensity of the reflected beam incident on each of the photo-detectors becomes a maximum. The cover member is provided over the aperture plate so as to be displaced integrally with the aperture plate by the aperture plate displacement unit. The cover member includes a transparent body that allows the light beams of the light source to pass therethrough and allows the light beams of the light source to be irradiated to the plurality of confocal apertures, and the cover member protects the plurality of confocal apertures from dust. The imaging optical system is designed in consideration of optical properties of a whole optical system including the transparent body of the cover member, and guides the reflected light beams having again passed through the confocal apertures to the photo-detector.

BRIEF DESCRIPTION OF THE DRAWINGS

The accompanying drawings, which are incorporated in and constitute a part of the specification, illustrate embodi

FIG. 6A is a side view of the aperture plate provided with the cover member according to the example shown in FIG. 1;

FIG. 6B is a perspective view of the aperture plate provided with the cover member;

FIG. 7 is an illustration showing an example of a timing chart for acquiring clear images;

DETAILED DESCRIPTION

Hereinbelow, a description will be given of a three-dimensional shape measuring apparatus according to embodiments of the present invention with reference to the drawings.

A three-dimensional shape measuring apparatus according to an embodiment of the present invention measures the shape of a measurement object by using a confocal optical system having a confocal aperture array of a two dimensional array type. The confocal aperture array is provided in such a manner that apertures are two-dimensionally arranged in an aperture plate so as to have a predetermined arrangement period. Examples of the measurement object include an electrode terminal (having a size of, for example, several ten to several hundred microns) of a component, such as an IC package, produced in mass production.

First Embodiment

Figure 1:
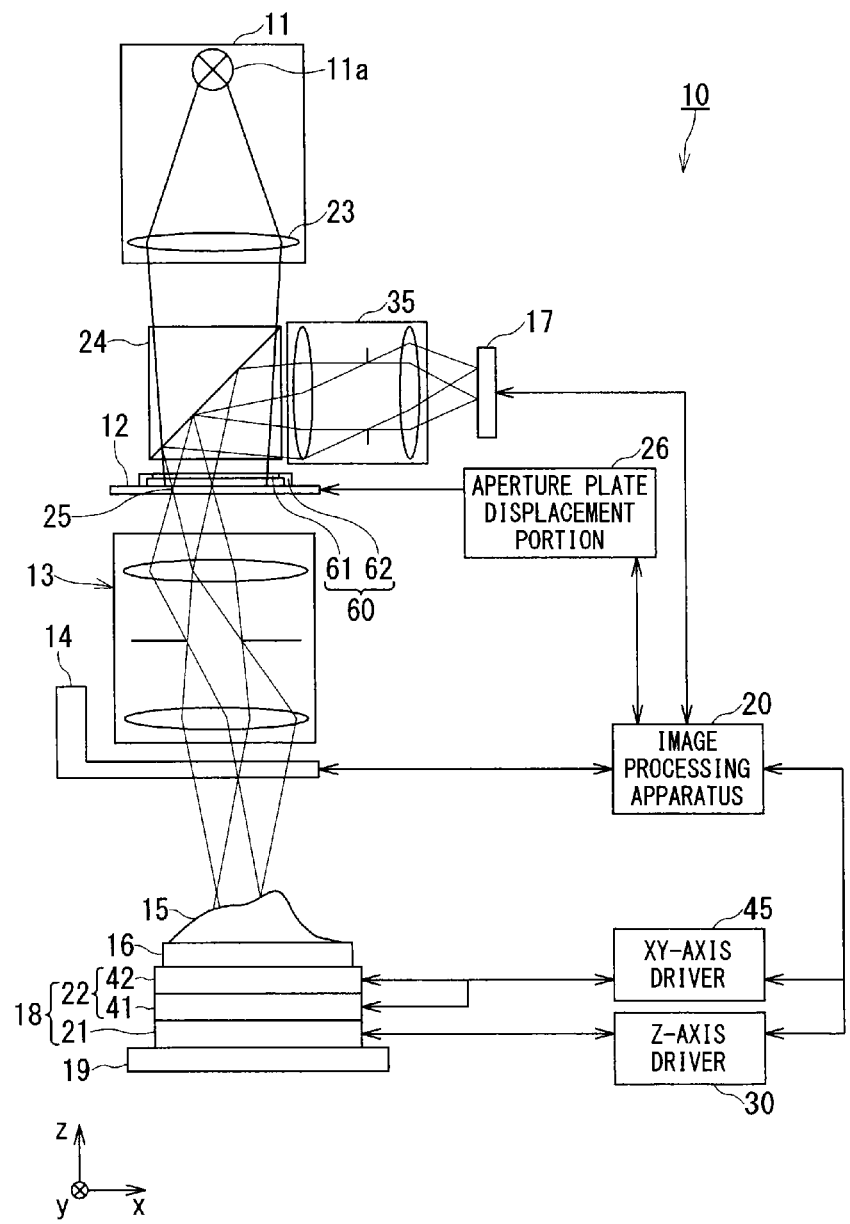
- FIG. 1 is a schematic overall view showing a configuration example of a three-dimensional shape measuring apparatus according to a first embodiment of the present invention.

FIG. 1 is a schematic overall view showing a configuration example of a three-dimensional shape measuring apparatus according to a first embodiment of the present invention. Note that, in the following description, the case where the optical axis direction is set as the Z-axis direction, and where the directions perpendicular to the optical axis direction are set as the X-axis direction and the Y-axis direction is described as an example.

A three-dimensional shape measuring apparatus 10 includes an illumination optical system 11 having a light source 11a, an aperture plate 12 arranged so that the main surface thereof is perpendicular to the optical axis direction, an objective lens 13, a focus position changing portion 14, a mount base 16 for mounting thereon a measurement object 15. The three-dimensional shape measuring apparatus 10 further includes a photo-detector group 17 having a plurality of photo-detectors 17a for receiving light beams reflected from the measurement object 15, a mount base driving portion 18 for moving the mount base 16 in each of the XYZ directions, a support base 19 supporting the mount base 16 and the mount base driving portion 18, and an image processing apparatus 20. The mount base driving portion 18 includes a mount base Z displacement portion 21 and a mount base XY displacement portion 22.

As the light source 11a, for example, a halogen lamp, laser, and the like, can be used. The light emitted from the light source 11a is formed into a planar illumination luminous flux via an illumination lens 23. This light illuminates the aperture plate 12 via a polarizing beam splitter 24.

Figure 2:
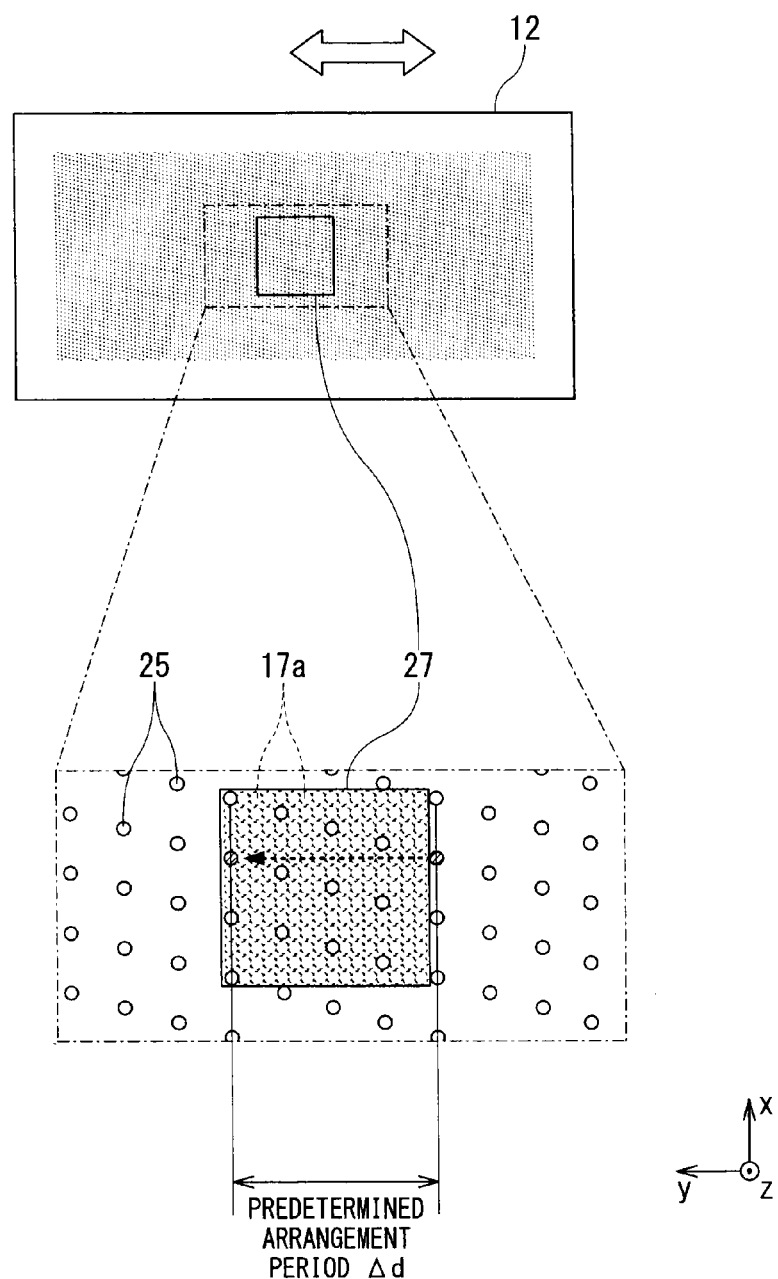
FIG. 2 is a plan view showing a configuration example of the aperture plate.

FIG. 2 is a plan view showing a configuration example of the aperture plate 12. The aperture plate 12 is configured such that a plurality of confocal apertures (hereinafter referred to as apertures) 25 are two dimensionally arranged so as to have a predetermined arrangement period $\Delta d$. The aperture plate 12 is driven by an aperture plate displacement portion 26, so as to be displaced in a predetermined direction perpendicular to the optical axis direction. In the following, an example of the case where the aperture plate 12 is displaced in the positive and negative direction in the Y-axis direction is described.

Generally, in order to reduce crosstalk between the light beams, it is necessary that the apertures 25 of the aperture array of the two dimensional arrangement type are provided so as to be separated from each other by a predetermined separation distance. For this reason, in the confocal optical system having the aperture array of the two dimensional arrangement type, the resolution in the in-plane direction perpendicular to the optical axis is restricted by this separation distance. On the other hand, in recent years, as for the two-dimensional image sensor using a solid-state imaging element, an image sensor having a very large number of pixels (for example, 5000×5000, and the like) has been developed.

To cope with this, in the present embodiment, one aperture 25 is made to correspond to a plurality of pixels by linearly scanning the aperture plate 12 in the state where the photo-detector group 17 is exposed.

As shown in the partially enlarged view of FIG. 2, when the aperture plate 12 is displaced by the predetermined arrangement period (period interval) $\Delta d$, the inside of an imaging target region 27 can be uniformly scanned once by the apertures 25. In FIG. 2, the positions corresponding to the photo-detectors (pixels) 17a configuring the photo-detector group 17 are virtually represented by broken lines.

When the exposure time of the photo-detector 17a is controlled to coincide with the time during which the aperture plate 12 is moved by the distance obtained by multiplying the arrangement period $\Delta d$ by a positive integer m, the time can be made uniform during which the light beam is irradiated to each of the photo-detectors 17a via each of the apertures 25. This control is performed by the image processing apparatus 20.

Each of the apertures 25 of the aperture plate 12 functions as a point light source. The light beam having passed through each of the apertures 25 is irradiated by the objective lens 13 onto the measurement object 15 via the focus position changing portion 14 so as to be converged at a spot (object side focused point) conjugate with the point light source. Each of the object side focused points is located on the surface (hereinafter referred to as object side focused plane) which is arranged at a predetermined position in the Z-axis direction and which is perpendicular to the optical axis direction. Note that the objective lens 13 may be configured by a plurality of lenses and diaphragms, so as to form, for example, a both-side telecentric optical system.

The aperture plate displacement portion 26 displaces the aperture plate 12 in the direction perpendicular to the optical axis direction. However, when the constant speed property of the aperture plate 12 is poor, unevenness is formed at random in an image, so as to deteriorate the shape measurement accuracy. To cope with this, it is preferred that the aperture plate displacement portion 26 is subjected to closed-loop control using a linear motor or a voice coil motor which is highly controllable and can perform direct driving.

The mount base Z displacement portion 21 is configured by a common drive device, such as a stepping motor, a servo motor or a piezo motor, and displaces the mount base 16 in the optical axis direction. The amount, the direction, and the timing of the displacement are controlled by the image processing apparatus 20 via a Z-axis driver 30. The mount base Z displacement portion 21 roughly displaces the mount base 16 in the optical axis direction, for example, before the start of measurement.

Figure 3:
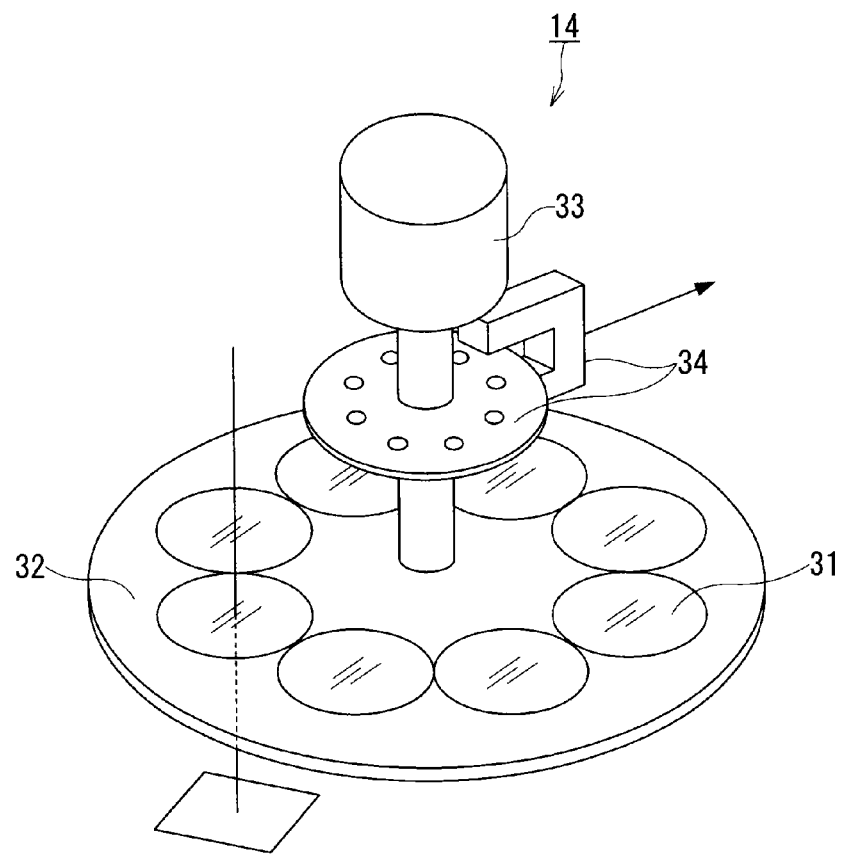
FIG. 3 is a perspective view showing a configuration example of the focus position changing portion.

FIG. 3 is a perspective view showing a configuration example of the focus position changing portion 14.

When a parallel plate-shaped transparent member 31 is arranged in the optical path of the objective lens 13, the position of the object side focused plane of the objective lens 13 is moved in the Z direction. The range of this movement can be controlled by the refractive index and the thickness of the transparent member 31.

For this reason, as shown in FIG. 3, the transparent members 31 are arranged on a rotating body 32 at regular intervals along the rotation direction of the rotating body 32. Each of the transparent members 31 is configured to have a different movement range of the position of the object side focused plane of the objective lens 13. When the rotating body 32 is continuously rotated at a predetermined speed by a driving portion 33, such as a motor, the position of the object side focused plane of the objective lens 13 can be moved discretely (stepwise) in the Z direction each time each of the transparent members 31 crosses the optical axis of the objective lens 13.

The rotating state of the rotating body 32 is detected by a timing sensor 34. The output of the timing sensor 34 is transmitted to the image processing apparatus 20. The information, which associates each of the transparent members 31 with the Z-axis coordinate of the object side focused point, is stored beforehand in the image processing apparatus 20. When, on the basis of the output of the timing sensor 34, the image processing apparatus 20 repeats the exposure of the photo-detector group 17 at the timing at which each of the transparent members 31 crosses the optical axis, the imaging can be performed easily and at high speed at each of the positions of the plurality of discrete object side focused points.

Note that the driving portion 33 may be configured to be controllable by the image processing apparatus 20. In this case, the image processing apparatus 20 can control the rotation speed of the rotating body 32.

Among the light beams reflected by the measurement object 15, particularly the light beam reflected at the object side focused point is converged by the objective lens 13 at the point (hereinafter referred to as image side focused point) having an optically conjugate relationship with the object side focused point. The aperture 25 serving as a point light source corresponds to the object side focused point one to one.

In the present embodiment, an example in the case where the image side focused point coincides with the aperture 25 serving as a point light source is described. In this case, the light beam having passed through the aperture 25 is converged at the object side focused point, and is reflected at the object side focused point, so as to again enter the aperture 25.

The light beam having again entered the aperture 25 is deflected by the polarizing beam splitter 24, so as to enter an imaging optical system 35 and to enter the photo-detector 17*a* forming the photo-detector group 17. Here, the imaging optical system 35 is configured so that an image at the aperture 25 is formed on the photoelectric conversion surface of the photo-detector group 17. The aperture 25 (image side focused point) and the photo-detector 17*a* arranged at the position corresponding to the aperture 25 are in an optically conjugate relationship with each other by the polarizing beam splitter 24 and the imaging optical system 35.

The photo-detector group 17 is a so-called two-dimensional image sensor. The photo-detector 17*a* configuring the photo-detector group 17 is configured by a CCD (Charge Coupled Device) image sensor or a CMOS (Complementary Metal Oxide Semiconductor) image sensor, and outputs, to the image processing apparatus 20, a signal corresponding to the intensity of an irradiated light beam. Further, the timing of photo-detection by the photo-detector group 17 is controlled by the image processing apparatus 20.

The image processing apparatus 20 can receive the signals outputted from the photo-detector group 17 and use the received signals as image data (hereinafter referred to as confocal image data) for generating an image (hereinafter referred to as confocal image). Further, the image processing apparatus 20 may generate, for example, for each exposure, a confocal image based on the confocal image data. In the present embodiment, an example in the case where the image processing apparatus 20 generates a confocal image for each exposure of the photo-detector group 17 is described. In addition, when the image processing apparatus 20 can obtain output signals of the photo-detector group 17 for each exposure of the photo-detector group 17, it is possible to perform three-dimensional shape measurement on the basis of the output signals, and hence the confocal image is not necessarily generated.

The mount base XY displacement portion 22 of the mount base driving portion 18 displaces the mount base 16 in the direction perpendicular to the optical axis direction. For example, the mount base XY displacement portion 22 is used for moving the measurement target region in the XY surface in each interval between the measurements.

The mount base XY displacement portion 22 includes an X-axis displacement mechanism 41 and a Y-axis displacement mechanism 42 which respectively perform the positioning of the mount base 16 in the X-axis direction and the Y-axis direction. Each of the X-axis displacement mechanism 41 and the Y-axis displacement mechanism 42 is configured by a servo motor for example. And the amount, the direction, and the timing of displacement of each of the X-axis displacement mechanism 41 and the Y-axis displacement mechanism 42 are controlled by the image processing apparatus 20 via an XY-axis driver 45.

Figure 4:
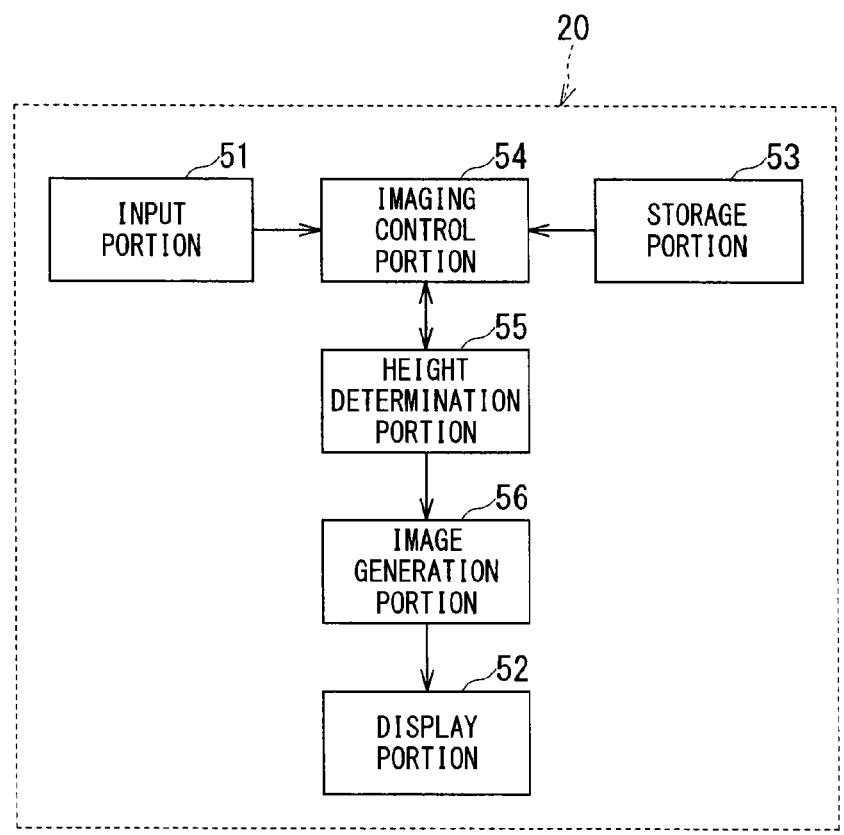
FIG. 4 is a block diagram schematically showing an example of an internal configuration of the image processing apparatus.

FIG. 4 is a block diagram schematically showing an example of an internal configuration of the image processing apparatus 20. The image processing apparatus 20 can be configured, for example, by a desktop type personal computer, a notebook type personal computer, or the like. The image processing apparatus 20 includes an input portion 51, a display portion 52, a storage portion 53, and a main control portion.

The input portion 51 is configured by common input devices, such as, for example, a keyboard, a touch panel, and a ten key, and outputs, to the main control portion, an operation input signal corresponding to a user's operation.

The display portion 52 is configured by a common display output device, such as, for example, a liquid crystal display or an OLED (Organic Light Emitting Diode) display, and displays a variety of information according to the control of the main control portion.

The storage portion 53 is a storage medium which can be read and written by a CPU. The storage portion 53 stores beforehand the information which associates each of the parallel plate-shaped transparent members 31 with the Z-axis coordinate of the object side focused point.

The main control portion is configured by the CPU, storage media including a RAM, and a ROM, and the like. The CPU of the main control portion loads, to the RAM, a linear scanning program stored in a storage media including the ROM, and data required for the execution of the program and stored in the storage media, and executes processing to linearly scan the surface of the measurement object.

The RAM of the main control portion provides a work area for temporarily storing the program executed by the CPU and the data. The storage media including the ROM of the main control portion store a start program and the linear scanning program of the image processing apparatus 20, and the various data required for the execution of the programs.

The storage media including the ROM and the storage portion 53 may be configured by including a CPU-readable recording medium, such as a magnetic recording medium, an optical recording medium, or a semiconductor memory, so that a part or all of the program and the data stored in the storage media are downloaded via an electronic network. Here, the electronic network means, as a whole, an information communication network using an electric communication technique, and includes a telephone communication network, an optical fiber communication network, a cable communication network, satellite communication network, and the like, in addition to a wireless or wired LAN (Local Area Network), and the Internet network.

The CPU of the main control portion executes the linear scanning program to thereby function at least as an imaging control portion 54, a height determination portion 55, and an image generation portion 56. Each of the portions 54 to 56 uses a required work area of the RAM as a temporary storage area of the data. Each of the portions 54 to 56 realizing the respective functions may also be configured by using a hardware logic circuit without using a CPU.

The imaging control portion 54 controls the focus position changing portion 14, the photo-detector group 17, and the aperture plate displacement portion 26. The image control portion 54 thereby makes the photo-detector group 17 perform exposure (imaging) for each period in which the imaging target region 27 is included in the parallel plate-shaped transparent member 31 while the aperture plate 12 is displaced in the Y-axis direction at a constant speed by the aperture plate displacement portion 26. At this time, the imaging control portion 54 controls the moving speed of the aperture plate 12, the rotation speed of the rotating body 32, and the exposure time and the exposure timing of the photo-detector group 17 so that the exposure time of the photo-detector group 17 coincides with the time in which the aperture plate 12 is moved by the distance obtained by multiplying the arrangement period Δd by a positive integer m.

The height determination portion 55 acquires the present Z-axis coordinate of the object side focused point (information on the transparent member 31 currently crossing the optical axis) from the imaging control portion 54 and also acquires the outputs of the photo-detector group 17. On the basis of the signal of the photo-detector 17a for each position of the object side focused point discretely changed in the optical axis direction, the height determination portion 55 calculates, for each of the photo-detectors 17a, the position of the measurement object 15 in the optical axis direction, at which position the intensity of the reflected light beam entering the photo-detector 17a becomes a maximum.

Here, when the coordinate system (mount base coordinate system) is considered whose origin is set at the center of the mount base 16, the XY coordinates of the measurement target region (imaging target region 27) in the mount base coordinate system can be uniquely obtained from the present position of the mount base XY displacement portion 22. For this reason, the XY coordinates in the mount base coordinate system, which correspond to each of the photo-detectors 17a, are uniquely determined in correspondence with the present position of the mount base XY displacement portion 22.

Conventionally, various methods have been known as methods being such that the Z-axis coordinate of the measurement object 15, at which coordinate the intensity of the reflected light beam becomes a maximum, is calculated on the basis of the intensity of a plurality of signals discretely acquired from the outputs of the photo-detectors 17a in the shape measuring technique using the confocal optical system. Among these methods, any method can be used.

Figure 5A:
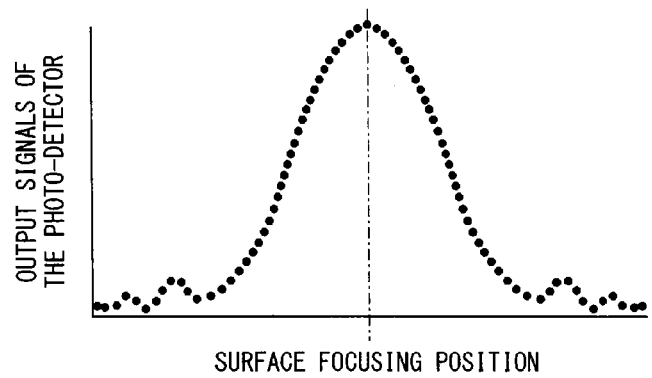
FIG. 5A is a view for explaining a method for calculating, by a conventional method, the Z-axis coordinate of the measurement object, at which coordinate the intensity of the reflected light beam becomes a maximum.
Figure 5B:
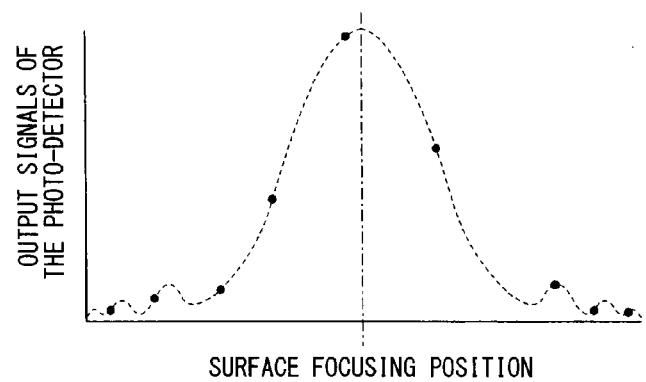
FIG. 5B is a view for explaining a method for calculating the Z-axis coordinate of the measurement object according to the present embodiment.

FIG. 5A is a view for explaining a method for calculating, by a conventional method, the Z-axis coordinate of the measurement object 15, at which coordinate the intensity of the reflected light beam becomes a maximum. FIG. 5B is a view for explaining a method for calculating the Z-axis coordinate of the measurement object 15 according to the present embodiment.

The mountain-shaped curve in FIG. 5 represents an on-axis response curve of the confocal optical system (outputs of the photo-detector 17a in the case where the relative position of the focus position (position of the object side focused point) of the objective lens 13 with respect to the measurement object 15 is changed in the direction in parallel with the optical axis direction). It can be said that, in the on-axis response curve, the peak position at the center of the mountain-shaped curve is a best focus position. This peak position is a relative position (hereinafter referred to as surface focusing position) at which the intensity of the reflected light beam incident on the photo-detector 17a becomes a maximum. Therefore, on the basis of the information on the peak position, it is possible to acquire the information on the optical axis direction position (surface height) at the XY position on the surface of the measurement object 15, which XY position corresponds to the photo-detector 17a.

However, as shown in FIG. 5A, in the conventional technique, a method has been used in which the output signals of the photo-detector 17a are obtained by finely moving the position of the object side focused point at a necessary resolution step size, so that a position corresponding to a maximum intensity is found out from the acquired output signals. In this method, it is necessary that 200 or more of confocal images are obtained for one measurement while the relative position of the focus position with respect to the measurement object 15 is changed in the direction in parallel with the optical axis direction, for example, by moving the mount base 16 in the Z direction.

On the other hand, when the aperture plate 12 is linearly scanned, the aperture plate 12 has to be very long in order that the aperture plate 12 is moved at a constant speed during the period in which all the large number of confocal images are acquired. To cope with this, the present embodiment uses an arithmetic operation method which can reduce the number of confocal images required for one measurement.

Specifically, as shown in FIG. 5B, while the relative position of the focus position (the object side focused point of the objective lens 13) with respect to the measurement object 15 in the optical axis direction is changed with a much larger step size than the necessary resolution step size (for example, with a step size enabling the data of about three points to be obtained in the central mountain-shaped distribution of the intensity of the reflected light beam), the exposure is performed at each of the relative positions, and the peak position of the central mountain-shaped distribution is estimated by using an interpolation operation.

Examples of the interpolation operation method include a method in which the mountain-shaped distribution is assumed to be a Gaussian distribution. When the peak position of the central mountain-shaped distribution is obtained by fitting the central mountain-shaped distribution to a Gaussian function, the peak position can be estimated by Equation (1) shown below. By equation (1), the peak position can be estimated based on the values of three points including one point which corresponds to a maximum value fp, and the other two points which respectively correspond to the values fp−1 and fp+1 and which are points before and after the point corresponding to the maximum value fp.

$$z\text{focus} = zp + (\ln(fp+1) - \ln(fp-1))/(2(2\ln(fp) - \ln(fp-1) - \ln(fp+1))) \quad (1)$$

Here, reference character zfocus denotes a focus position which provides the peak of the mountain-shaped distribution, and reference character zp denotes a focus position which provides the maximum value fp.

With such interpolation operation, the number of positions of the object side focused points (optical axis direction measurement positions) which are necessary for the height determination and which are discretely changed in the optical axis direction, that is, the number of input confocal images can be significantly reduced as compared with the conventional method. For example, although 200 confocal images are conventionally required, the number of the images can be reduced to 20 or less.

The optical axis direction position of the measurement object 15 is calculated for each of the photo-detectors 17a by the height determination portion 55. On the basis of the optical axis direction position of the measurement object 15, the image generation portion 56 generates a shape image of the measurement object 15 so as to enable the shape image to be displayed by the display portion 52.

Note that the number of positions of the object side focused points (optical axis direction measurement positions), which are necessary for one measurement (processing for generating one shape image) and which are discretely changed in the optical axis direction, may be set to a fraction of a positive integer (for example, ½, ⅓, or the like) of the number of the transparent members 31 of the rotating body 32. For example, in the case where the number of the optical axis direction measurement positions coincides with the number of the transparent members 31 of the rotating body 32, one measurement can be performed by one rotation of the rotating body 32. Further, the number of the periods of the apertures 25 provided in the aperture plate 12 may be set to a number with which at least one measurement can be performed while the aperture plate 12 is moved at a constant speed in a predetermined direction (one of the positive and negative direction) of the Y-axis direction.

Further, the measurement may also be performed in such a manner that at least one measurement is performed while the aperture plate 12 is moved at the constant speed in the predetermined direction (one of the positive and negative direction) of the Y-axis direction, and that, after the moving direction of the aperture plate 12 is reversed and then the aperture plate 12 is moved at the constant speed, the next measurement is performed. Furthermore, at this time, in the period in which the aperture plate 12 is accelerated and decelerated for movement direction inversion, or the like, of the aperture plate 12, the measurement target region may also be changed by moving the measurement object 15 in the XY axis direction. In this case, the time required for a plurality of times of the measurement as a whole can be reduced.

Note that the confocal "microscope" is mainly used for observation, and hence is required to perform continuous imaging. In this respect, it can be said that the confocal microscope using the Nipkow disk is convenient because, with it, confocal images can be continuously obtained as long as the Nipkow disk is rotated. However, in the surface shape measurement, there is an interval between each of the measurements (each of the visual fields), and hence it is not necessary to continuously perform the imaging. Therefore, there is no problem as long as one measurement is completed during the period in which the aperture plate 12 is moved at a constant speed even when a discrete scanning method such as the method using the movement of the aperture plate 12 according to the present embodiment is used instead of the continuous scanning method, such as the scanning method using the rotation of the Nipkow disk.

The three-dimensional shape measuring apparatus 10 according to the present embodiment can linearly scan the aperture plate 12. Therefore, when, while the photo-detector group 17 is exposed, the aperture plate 12 is linearly scanned, one aperture 25 can be made to correspond to a plurality of pixels, so that high resolution can be realized. Further, the scanning trajectory of the object side focused point can be made to follow a strict straight line, and hence the scanning region (measurement target region) on the surface of the measurement object 15 can be formed in a rectangular shape. Therefore, the compatibility with the two-dimensional image sensor can be improved as compared with the case where the Nipkow disk is used.

In the present embodiment, an example of the case where the aperture plate 12 is a pinhole array type provided with a plurality of pinholes (apertures 25) is described. In this case, it is only necessary that the apertures are arranged to have a predetermined arrangement period Δd, and hence a slit array type aperture plate may also be used. In the case where a slit array type aperture plate is used as the aperture plate 12, with the long side of each slit being set in the direction perpendicular to the moving direction of the aperture plate 12, the predetermined arrangement period can be handled as Δd when a plurality of slits are arranged so that the interval in the moving direction between the centers of the slits adjacent to each other is a positive integer fraction of Δd.

In the case where the aperture plate 12 having such slits is used, a minimum scan width required to acquire a confocal image is equal to the interval (pitch) between the centers of the slits adjacent to each other. That is, when the aperture plate 12 is moved by the pitch of the slit, the confocal data can be obtained by all the photo-detectors 17a configuring the photo-detector group 17. For this reason, when the slit array type aperture plate 12 is used, the moving distance of the aperture plate 12 required to acquire one confocal image can be reduced as compared with the case where the pinhole array type aperture plate 12 is used.

Next, a detailed configuration of the aperture plate 12 and a dust-proof method of the aperture plate 12 will be described.

The aperture 25 is formed in the aperture plate 12 so as to have a diameter size of one to several μm. For this reason, a dust-proof measure is taken for at least the region (hereinafter referred to as aperture region) in which a plurality of the apertures 25 is formed. When a method of closing the whole optical system of the three-dimensional shape measuring apparatus 10 with housing, or a method of closing the aperture plate 12 and the aperture plate displacement portion 26 with housing is adopted as a dust-proof measure of the aperture region, any of the methods needs a large-scale configuration and also dust may be generated from the driving portion, such as the aperture plate displacement portion 26, so as to adhere to the aperture array region.

To cope with this, the three-dimensional shape measuring apparatus 10 according to the present embodiment includes a cover member 60 for protecting the aperture plate 12 from dust. The cover member 60 is used for protecting both sides of the aperture region of the aperture plate 12 from dust. FIG. 1 schematically shows an example of a configuration of the cover member 60. Further, FIG. 6A is a side view of the aperture plate 12 provided with the cover member 60 according to the example shown in FIG. 1, and FIG. 6B is a perspective view of the aperture plate 12 provided with the cover member 60.

In the configuration example of the cover member 60 shown in FIG. 1 and FIG. 6, the aperture plate 12 is configured by a transparent substrate 12a. This configuration is suitable for the case where the light source-side surface of the transparent substrate 12a is chromium-etched to form the apertures 25. In this case, the objective lens-side surface of the aperture region is protected from dust by the transparent substrate 12a. For this reason, only the light source-side surface of the aperture region needs to be protected from dust by the cover member 60. Therefore, as shown in FIG. 1 and FIG. 6, it is only necessary that the cover member 60 is detachably provided on the light source side of the aperture plate 12 (on the side surface on which the apertures 25 are formed) so as to cover the apertures 25 and to protect the light source-side surface of the aperture region from dust. The configuration of the aperture plate 12 and the cover member 60 in this case will be described in more detail below.

The cover member 60 includes a transparent body 61, a support member 62 of the transparent body 61, and an intermediate plate 63. On the other hand, the aperture plate 12 includes an aperture region in which a plurality of the apertures 25 is formed on the light source-side surface of the transparent substrate 12a.

Each of the support member 62 and the intermediate plate 63 is provided with an opening for transmitting the light beam from the light source 11a. The entire circumference of the transparent body 61 is bonded to the inner side or the outer side of the opening of the support member 62. The support member 62 is screwed to the intermediate plate 63 so that the center of the opening of the support member 62 substantially coincides with the center of the opening of the intermediate plate 63. Moreover, when a packing 64, such as an O-ring, is provided on the contact surface between the support member 62 and the intermediate plate 63 so as to surround the opening of the intermediate plate 63, a dust-proof effect can be further improved.

Further, to the side surface of the intermediate plate 63, which side surface is opposite to the fixing side of the support member 62, the entire periphery of the aperture plate 12 is welded so that the forming surface 65 of the apertures 25 and the opening of the intermediate plate 63 face each other. As a result, the aperture region, in which a plurality of the apertures 25 are formed, can be provided in the closed space formed by the aperture plate 12, the transparent body 61, the support member 62, and the intermediate plate 63. Further, the aperture plate 12 and the cover member 60 are integrally displaced in the Y-axis direction by the aperture plate displacement portion 26.

Note that the entire periphery of the aperture plate 12 need not be welded to the intermediate plate 63, and the aperture plate 12 may be detachably screwed to the intermediate plate 63 via a packing, such as an O ring. In this case, the cover member 60 is detachably attached to the aperture plate 12. In the case where the aperture plate 12 is detachably press-fitted to the cover member 60, the exchange and maintenance of the aperture plate 12 can be easily performed.

The intermediate plate 63 is screwed to the longitudinal portion of an L-shaped jig 66 so that the aperture plate 12 is mounted in the opening of the L-shaped jig 66. The lateral portion of the L-shaped jig 66 is screwed to an aperture plate mounting portion 67. The aperture plate mounting portion 67 is displaced in the Y-axis direction along a linear guide 68a by a linear motor 68 controlled by the imaging control portion 54. The drive control of the linear motor 68 is performed by using output signals from a sensor group 69 of various sensors provided in the vicinity of the linear guide 68a. An origin sensor, a limit sensor, and the like, are included in the sensor group 69.

The cover member 60 is provided on the light source side forming surface 65 of the apertures 25 of the aperture plate 12 so as to cover the aperture region and to protect the light source side of the aperture region from dust. Thereby, as compared with the case where the whole aperture plate displacement portion 26 is covered with housing, or the case where the whole optical system of the three-dimensional shape measuring apparatus 10 is covered with housing, dust-proof can be attained by a very light-weight and simple configuration, and also the adverse effect of dust generated by the motor can be prevented.

Each of the transparent body 61 and the transparent substrate 12a prevents dust from adhering to the aperture region of the aperture plate 12, but cannot prevent dust from adhering to each of the transparent body 61 and the transparent substrate 12a itself. However, when each of the transparent body 61 and the transparent substrate 12a has a sufficient thickness, dust adhering to the surface of each of the transparent body 61 and the transparent substrate 12a is separated from the position of the aperture plate 12. This position of the aperture plate 12 is the image forming position of the imaging optical system 35 and of the objective lens 13. Hence, the diameter of the image forming luminous flux is large at the position of dust adhering to the surface of each of the transparent body 61 and the transparent substrate 12a. Therefore, the image forming luminous flux cannot be thoroughly blocked by the dust, and hence the influence of the dust is small.

However, when the thick transparent body 61 is inserted into the optical path, the influence of the transparent body 61 on the image forming performance of the imaging optical system 35 cannot be neglected. Therefore, the imaging optical system 35 needs to be designed in consideration of the thickness of the transparent body 61. Of course, optical glass having no striae and having sufficiently high surface accuracy and parallelism needs to be used as the transparent body 61.

Note that an example of the case where the apertures 25 are formed on the light source side of the transparent substrate 12a, and where the cover member 60 protects the light source side of the aperture region from dust is shown in FIG. 1 and FIG. 6, but the aperture plate 12 and the cover member 60 may be arranged so as to be inverted as a whole on the optical path. That is, the apertures 25 may be formed on the objective lens side of the transparent substrate 12a, and the objective lens side of the aperture region may be protected from dust by the cover member 60.

Further, it is only necessary that the cover member 60 has a configuration in which both sides of the aperture region of the aperture plate 12 are protected from dust. Therefore, the configuration of the cover member 60 is not limited to the configuration as shown in FIG. 1 and FIG. 6. In the configuration example shown in FIG. 1 and FIG. 6, one side surface of the aperture region of the aperture plate 12 is protected from dust by the transparent substrate 12a, and hence it is only necessary that the cover member 60 is configured so as to be able to protect the other side surface of the aperture region from dust. On the other hand, for example, when the aperture plate 12 is formed of a plate having high light-shielding properties (including a metal plate, a plastic plate coated with light-shielding paint, and the like), and when the apertures 25 are formed by providing holes in the plate, it is preferred that the cover member 60 is configured so as to cover both the light source side and the objective lens side of the aperture region of the aperture plate 12. At this time, it is preferred that the cover member 60 includes, for example, two sets of the transparent body 61 and the support member 62 which are shown in FIG. 1, and that each of the sets is detachably provided on each of the light source side and the objective lens side of the aperture region of the aperture plate 12 formed of the plate having high light-shielding properties.

Next, the imaging control method by the imaging control portion 54 will be described.

The imaging control portion 54 controls the focus position changing portion 14, the photo-detector group 17, and the aperture plate displacement portion 26. The imaging control portion 54 thereby controls the moving speed of the aperture plate 12, the rotation speed of the rotating body 32, and the exposure time and the exposure timing of the photo-detector group 17 so that the exposure time of the photo-detector group 17 coincides with the time in which the aperture plate 12 is moved by the distance obtained by multiplying the arrangement period $\Delta d$ by a positive integer m. For example, when the arrangement period $\Delta d$ of the apertures 25 is 100 μm, and when the constant moving speed v of the aperture plate 12 is 10 mm/s, the time $\Delta t$ required for the aperture plate 12 to move the arrangement period $\Delta d$ is 10 ms. In this case, the exposure time $\Delta t1$ of the photo-detector group 17 is controlled so as to accurately coincide with the time obtained by multiplying $\Delta t=10$ ms by the positive integer m.

However, even in the case where the exposure time $\Delta t1$ accurately coincides with $m \cdot \Delta t$, when there is a subtle error in the exposure time $\Delta t1$, a pattern generated in an image. The pattern is determined by the positions of the apertures 25 at the exposure start time. That is, underexposure or overexposure occurs in the pixels in the vicinity of the positions of the apertures 25 at the exposure start time, so as to appear as a pattern. Further, in the case where the arrangement direction of the apertures 25 and the moving direction of the aperture plate 12 do not accurately coincide with each other and are inclined toward each other, even when the inclination is minute, a similar pattern appears. This pattern is also determined by the positions of the apertures 25 at the exposure start time. Therefore, when the apertures 25 are positioned at random at the exposure start time, the pattern is also changed at random.

Meanwhile, the exposure start timing is determined according to the trigger timing of the timing sensor 34 of the focus position changing portion 14. For this reason, for example, when the number of revolutions of the rotating body 32 is determined completely independently of the aperture plate displacement portion 26, the above-described pattern is changed almost at random for each image acquisition, so as to be reflected as noise components in the on-axis response curve used for the measurement operation. Thereby, the measurement accuracy is deteriorated.

In order to avoid such problem, it is necessary that the exposure is prevented from starting at a random timing, and that the exposure is allowed to be started only at the interval corresponding to an integer multiple of the time (10 ms in the above-described example) during which the aperture plate 12 is moved by the arrangement period $\Delta d$. Thereby, the random generation of the pattern is prevented, so that clearer images can be obtained.

FIG. 7 is an illustration showing an example of a timing chart for acquiring clear images.

As shown in FIG. 7, the imaging control portion 54 makes the photo-detector group 17 perform exposure each time the transparent member 31 of the rotating body 32 crosses the optical axis. At this time, the imaging control portion 54 makes the exposure time $\Delta t1$ of the photo-detector group 17 coincide only with the time $m \cdot \Delta t$ obtained by multiplying, by a positive integer m, the time $\Delta t$ required for the aperture plate 12 to be moved by the arrangement period $\Delta d$. At this time, the imaging control portion 54 controls the moving speed v of the aperture plate 12 so that the moving speed v is set as $v=\Delta d/\Delta t$. Further, the imaging control portion 54 makes the interval between the exposure start times adjacent to each other coincide with the time $n \cdot \Delta t$ obtained by multiplying $\Delta t$ by a positive integer n (for n>m).

For example, in the above-described example, the case where m=1 and n=2 is considered. In this case, it is assumed that images are obtained in such a manner that the highest imaging speed of the camera is 60 fps (about 17 ms/sheet). It is also assumed that after the exposure is performed at an exposure start timing (which may be set at random) of a first image at the start of measurement, the exposure for the next image is started at an interval of 20 ms from the exposure start timing, so as to obtain the next image. Of course, it is assumed that the exposure time is accurately set to 10 ms. In this case, the pattern, which appears in each of the images obtained subsequently to the first image, appears at completely the same position as the pattern of the first image. When the apertures 25 at the exposure start time are positioned at random, the pattern is also changed at random, so as to be mixed as noise in the on-axis response curve, and thereby the measurement accuracy is affected. However, when the position of the pattern is not changed and fixed, the pattern does not appear as noise in the on-axis response curve, but merely appears in the form of difference in the height (intensity) of the curve as a whole. Therefore, the pattern hardly affects the measurement accuracy.

Further, when one measurement is completed by the acquisition of the number of images corresponding to the number of transparent members 31 provided on the rotating body 32, it is preferred that the rotation speed of the rotating body 32 is made to coincide with the reciprocal of the exposure (image input) period multiplied by the number of the transparent members 31. For example, when the number of the transparent members 31 is assumed to be 10, the exposure period multiplied by the number of the transparent members 31 in the above-described example is obtained as 20 ms×10 (members)=200 ms, and hence the rotating body 32 is rotated at the rotation speed of $1/200$ ms=5 rps. When the speed of the rotating body 32 is accurate, and when the timing sensor 34 has high accuracy and can generate the timing signal at the interval of 20 ms accurately (within a negligible error), the above-described object can be achieved. Further, when the timing signal of the rotating body 32 is not accurate, 10 images may be acquired in such a manner that, after the measurement start instruction, the exposure is started by using the first signal of the timing sensor 34 as a trigger, and subsequently the exposure is started accurately at the interval of 20 ms. In this way, it is only necessary that the speed of the rotating body is not largely deviated only during at most one rotation period, and hence the accuracy of the rotation speed of the rotating body is not so severely required.

Next, a method for reducing the influence of the force generated by acceleration and deceleration of the aperture plate 12 will be described.

It is preferred that the aperture plate 12 is accelerated to a constant speed as quickly as possible. However, it is considered that, when the aperture plate 12 is quickly accelerated and decelerated, the aperture plate 12 may be vibrated by the force generated by the acceleration and deceleration, so as to lower the measurement accuracy. In order to reduce the effect of the force generated by the acceleration and deceleration of the aperture plate 12, it is preferred to provide a reaction force mechanism.

Figure 8:
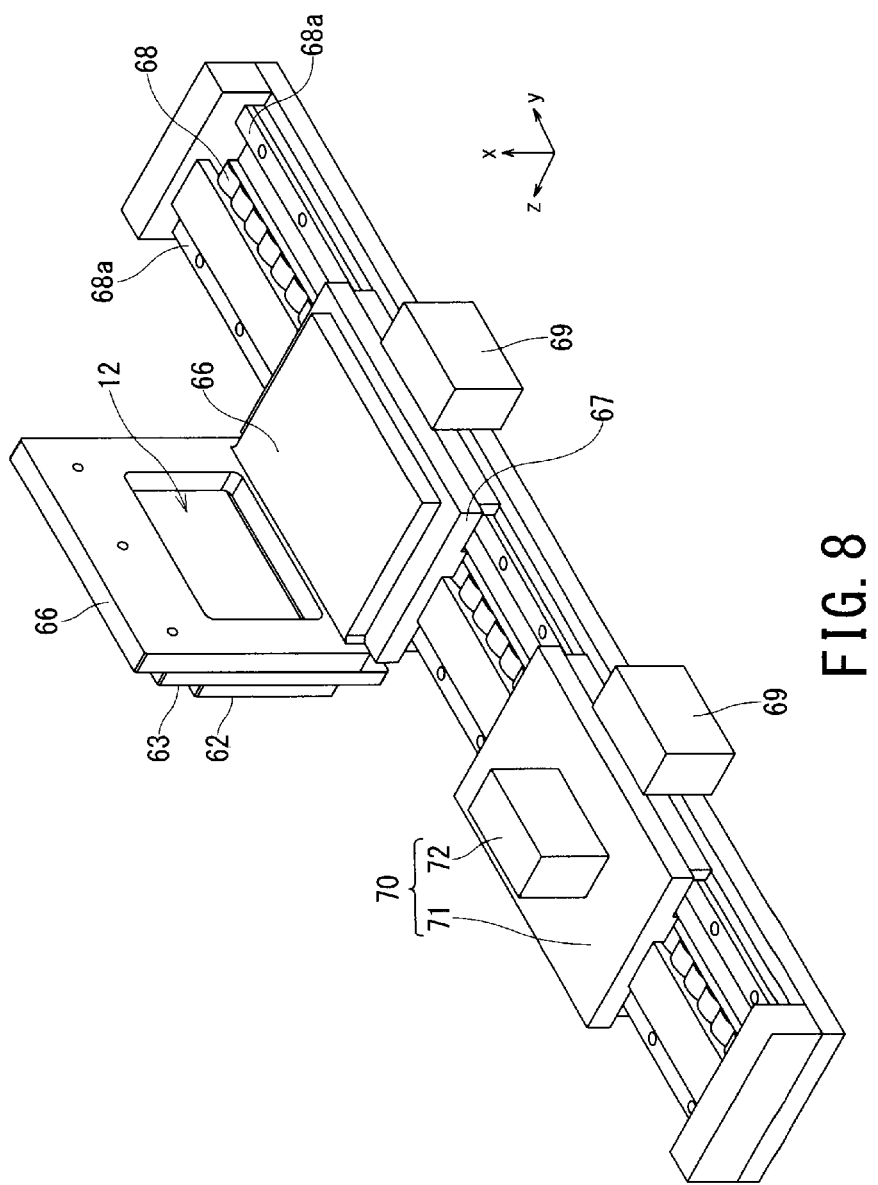
FIG. 8 is a perspective view showing a configuration example of a reaction force mechanism.

FIG. 8 is a perspective view showing a configuration example of a reaction force mechanism 70. The reaction force mechanism 70 includes a movable body 71 which is displaced by the linear motor 68 in the Y-axis direction along the linear guide 68a, and an adjusting member 72 which is provided on the movable body 71 so as to be displaced integrally with the movable body 71.

The movable body 71 is driven by the linear motor 68 controlled by the imaging control portion 54 and thereby reduces (cancels) the influence of the force generated by the acceleration and deceleration of the aperture plate 12. For example, when the weight of the adjusting member 72 is selected so that the weight of articles placed on the aperture plate mounting portion 67 plus the weight of the aperture plate mounting portion 67 itself coincides with the weight of the reaction force mechanism 70, the center of gravity of the aperture plate mounting portion 67 and the reaction force mechanism 70 exists in the middle between the aperture plate mounting portion 67 and the movable body 71. In this case, for example, when the movable body 71 and the aperture plate mounting portion 67 are respectively accelerated or decelerated at the same rate in the opposite directions so as to be positioned symmetrically with respect to the center of gravity described above, the influence of the force generated by the acceleration or deceleration of the aperture plate 12 can be reduced.

Second Embodiment

Next, a second embodiment of a three-dimensional shape measuring apparatus according to the present invention will be described.

Figure 9:
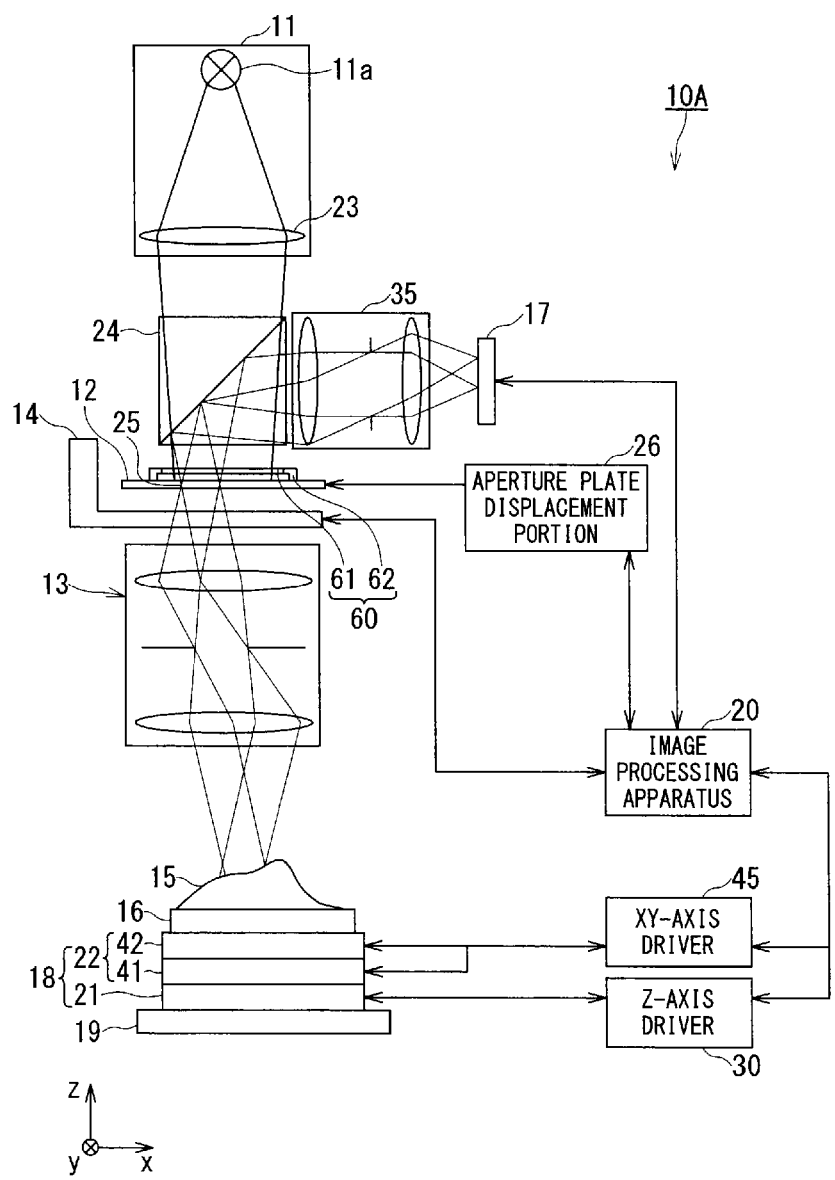
FIG. 9 is a schematic overall view of a configuration example of a three-dimensional shape measuring apparatus according to a second embodiment of the present invention.

FIG. 9 is a schematic overall view of a configuration example of a three-dimensional shape measuring apparatus 10A according to a second embodiment of the present invention.

The three-dimensional shape measuring apparatus 10A shown as the second embodiment is different from the three-dimensional shape measuring apparatus 10 shown as the first embodiment in that the focus position changing portion 14 is provided on the side of the aperture plate 12 with respect to the objective lens 13. Since the other configurations and operations of the three-dimensional shape measuring apparatus 10A are not substantially different from those of the three-dimensional shape measuring apparatus 10 shown in FIG. 1, the same components and configurations are denoted by the same reference numerals and characters, and their explanation is omitted.

A microscope is used in such a manner that the (observation) accuracy is improved by increasing the magnification by exchanging the objective lens, and on the contrary, the (observation) accuracy is lowered to observe a whole object in a large visual field. In this way, a microscope enables an optimum enlargement magnification to be selected according to an observation purpose, and hence has high flexibility.

It is desired that the three-dimensional shape measuring apparatus has such flexibility. However, as in the case of the three-dimensional shape measuring apparatus 10 according to the first embodiment, when the focus position changing portion 14 including the rotating body 32 is inserted on the side of the measurement object 15 (between the measurement object 15 and the objective lens 13), such flexibility cannot be obtained. This is because the thickness pitch of the transparent member 31 on the rotating body 32 is determined so that the value of three or more points can be sampled in the central mountain-shaped portion of the confocal on-axis response curve (curve representing the output change of the detector when the object-side focused point is moved in the Z direction), though the NA (numerical aperture) of the objective lens 13 on the side of the measurement object 15 is changed when the objective lens 13 is exchanged.

The width of the central mountain-shaped portion is determined by the NA on the side of the measurement object 15. For this reason, when the objective lens 13 is exchanged, it is also necessary to change the pitch of the transparent member 31 provided on the rotating body 32. That is, it is necessary to exchange not only the objective lens 13 but also the rotating body 32 itself.

Figure 10:
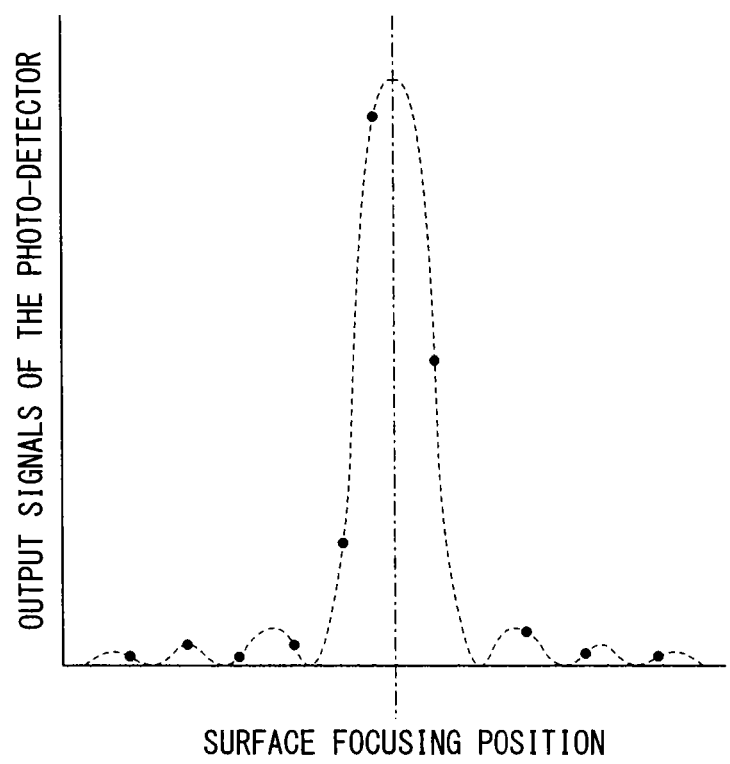
FIG. 10 is a view for explaining a method for calculating the Z-axis coordinates of the measurement object according to the second embodiment.

FIG. 10 is a view for explaining a method for calculating the Z-axis coordinates of the measurement object according to the second embodiment.

The NA of the objective lens 13 on the side of the measurement object 15 is determined by the image side NA multiplied by the magnification if the NA on the image side (on the side of the aperture plate 12 with respect to the objective lens 13) is not changed, that is, the state where the imaging lens on the image side is not exchanged (and in this state, the objective lens 13 is exchanged in a common microscope). Further, the width of the central mountain-shaped portion is inversely proportional to the square of the NA on the side of the measurement object 15. That is, the width of the central mountain-shaped portion is inversely proportional to the square of magnification.

Therefore, as shown in FIG. 9, when the rotating body 32 is located in the space on the image side (the side of the aperture plate 12), the sampling pitch in the image side space, which sampling pitch is determined by the thickness pitch of the transparent member 31, is inversely proportional to the longitudinal magnification (square of transverse magnification) of the lens in the space on the side of the measurement object 15. For this reason, as can be seen from comparison between FIG. 5B and FIG. 10, even when the objective lens 13 is exchanged to change the magnification, not only the width of the central mountain-shaped portion but also the sampling pitch on the side of the measurement object 15 are similarly automatically changed so as to be inversely proportional to the square of the transverse magnification. Therefore, as shown in FIG. 9, in the case where the rotating body 32 is located in the image side space (on the side of the aperture plate 12), even when the objective lens 13 is exchanged, it is not necessary to exchange the rotating body 32. Of course, the object side space in the optical axis direction (the measurement range in the Z axis direction), in which space the measurement can be actually performed, is also changed inversely proportional to the square of transverse magnification. However, a smaller object is usually observed at higher magnification, and hence such change is reasonable.

Therefore, with the three-dimensional shape measuring apparatus 10A according to the second embodiment, the magnification of the objective lens 13 can be easily changed. Further, as compared with the case where the focus position changing portion 14 is provided on the side of the measurement object 15, the working distance in the space on the side of the measurement object 15 can be sufficiently secured, so that workability can be improved, and also auxiliary illumination, such as oblique incident illumination, can be easily provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the focus position changing portion 14 is not limited to the configuration shown in FIG. 3 as long as it can move the position of the object side focused point of the objective lens 13 in the Z direction. For example, the focus position changing portion 14 may also be configured by an optical path length adjusting member which is formed of a transparent body having a predetermined refractive index and a thickness variable in the optical axis direction, and an adjusting member driving portion which changes the thickness of the transparent body in the optical axis direction. In this case, the focus position changing portion 14 can change the position of the object side focused point in the optical axis direction in such a manner that the optical path length of the light beam passing through the optical path length adjustment member is changed by changing the optical-axis-direction thickness of the transparent body crossing the optical axis. The optical path length adjustment member can be configured, for example, by two parallel plane glass plates arranged in parallel with each other, and a liquid filled between the glass plates. In this case, the adjusting member driving portion can change the optical path length by changing the volume of the liquid.

What is claimed is:

1. A three-dimensional shape measuring apparatus using a confocal optical system, comprising:
    an aperture plate provided with a plurality of confocal apertures which respectively allow light beams from a light source to pass therethrough and which are two-dimensionally arranged to have a predetermined arrangement period;
    an objective lens configured to converge each of the light beams having passed through the plurality of confocal apertures, at an object side focused point, and again converge each of reflected light beams formed by reflection of converged light beams at a measurement object, at respectively corresponding confocal apertures;
    a focus position changing unit including a rotating body provided thereon with a plurality of parallel plate type members different from each other at least in one of refractive index and thickness and arranged along a rotation direction so as to cross an optical axis of the objective lens, and a driving portion configured to continuously rotate the rotating body at a predetermined speed, the focus position changing unit being configured to discretely change a position of the object side focused point in an optical axis direction each time the parallel plate type member crossing the optical axis is changed by rotation of the rotating body;
    a photo-detector group including a plurality of photo-detectors each of which outputs a signal corresponding to an intensity of a reflected light beam having again passed through the confocal aperture;
    an aperture plate displacement unit configured to displace the aperture plate at a constant speed in a predetermined direction perpendicular to the optical axis direction so as to change a relative positional relationship between the position of the object side focused point and a position of the measurement object in the direction perpendicular to the optical axis direction;
    an imaging control unit configured to make the photo-detector group perform exposure a plurality of times in a period of constant speed movement of the aperture plate in the predetermined direction perpendicular to the optical axis direction, and to make the photo-detector group perform each of the exposures each time an imaging target region is included in the parallel plate type member, and to control a moving speed of the aperture plate, a rotation speed of the rotating body, and an exposure time and exposure timing of the photo-detector group so that the exposure time of the photo-detector group coincides with a time during which the aperture plate is moved by a distance obtained by multiplying the predetermined arrangement period by a first positive integer;
    a height determination unit configured to, based on the signal of the photo-detector for each of the positions of the object side focused points discretely changed in the optical axis direction by the focus position changing unit, estimate the position of the measurement object at which the intensity of the reflected beam incident on each of the photo-detectors becomes a maximum;
    a cover member provided over the aperture plate such that the cover member is displaced integrally with the aperture plate by the aperture plate displacement unit and such that the plurality of confocal apertures are provided in a closed space formed by the cover member and the aperture plate, the cover member being configured to include a transparent body that is provided between the light source and the aperture plate, that allows the light beams of the light source to pass therethrough and that allows the light beams of the light source to be irradiated to the plurality of confocal apertures; and
    an imaging optical system designed in consideration of optical properties of a whole optical system including the transparent body of the cover member, and configured to guide the reflected light beams having again passed through the confocal apertures to the photo-detector.

2. The three-dimensional shape measuring apparatus according to claim 1, wherein the cover member is detachably attached to the aperture plate.

3. The three-dimensional shape measuring apparatus according to claim 1, wherein
    the imaging control unit further controls the moving speed of the aperture plate, the rotation speed of the rotating body, and the exposure time and the exposure timing of the photo-detector group so that, in the plurality of times of exposures, a period from any exposure start time to a next exposure start time coincides with a time required for the aperture plate to be moved by a distance obtained by multiplying the predetermined arrangement period by a second positive integer larger than the first positive integer.

4. The three-dimensional shape measuring apparatus according to claim 1, wherein
the focus position changing unit is arranged between the aperture plate and the objective lens so that the plurality of parallel plate type members cross the optical axis of the objective lens on a side of the aperture plate.

5. The three-dimensional shape measuring apparatus according to claim 1, further comprising:
a mount base on which the measurement object is mounted; and
a mount base displacement unit configured to displace the mount base in the direction perpendicular to the optical axis direction, so as to change the relative positional relationship between the position of the object side focused point and the position of the measurement object in the direction perpendicular to the optical axis,
wherein the mount base displacement unit changes the relative positional relationship between the position of the object side focused point and the position of the measurement object in the direction perpendicular to the optical axis direction in a period except a period in which the aperture plate is displaced at the constant speed in the predetermined direction perpendicular to the optical axis direction, and
the period except the period in which the aperture plate is displaced at the constant speed in the predetermined direction perpendicular to the optical axis direction is a period in which the aperture plate is accelerated and decelerated by the aperture plate displacement unit in the predetermined direction, and a time or a period when a direction of movement of the aperture plate is reversed by the aperture plate displacement unit in the predetermined direction.

6. The three-dimensional shape measuring apparatus according to claim 1, wherein the aperture plate displacement unit includes:
an aperture plate mounting unit on which the aperture plate is mounted; and
a linear motor controlled by the imaging control unit and configured to displace the aperture plate mounting unit in the predetermined direction perpendicular to the optical axis direction.

7. The three-dimensional shape measuring apparatus according to claim 6, wherein
the aperture plate displacement unit further includes a reaction force mechanism which is displaced in the predetermined direction perpendicular to the optical axis direction, and
the imaging control unit operates the reaction force mechanism so as to reduce influence of a force generated by acceleration and deceleration of the aperture plate mounting unit by the linear motor.

8. The three-dimensional shape measuring apparatus according to claim 1, wherein
the focus position changing unit comprises
an optical path length adjusting member formed of a transparent member provided at a position crossing the optical axis of the objective lens and having a predetermined refractive index and a variable thickness in the optical axis direction, and
an adjusting member driving unit configured to change a thickness of the transparent member in the optical axis direction, and
the focus position changing unit is configured to change the position of the object side focused point in the optical axis direction in such a manner that an optical path length is changed by changing the optical axis direction thickness of the transparent member crossing the optical axis.

\* \* \* \* \*